US010798048B2

United States Patent
Lim et al.

(10) Patent No.: US 10,798,048 B2
(45) Date of Patent: Oct. 6, 2020

(54) ADDRESS RESOLUTION PROTOCOL SUPPRESSION USING A FLOW-BASED FORWARDING ELEMENT

(71) Applicant: Nicira, Inc., Palo Alto, CA (US)

(72) Inventors: Harold Vinson C. Lim, Mountain View, CA (US); Mart Haitjema, San Francisco, CA (US); Srinivas Neginhal, Santa Clara, CA (US); Pankaj Thakkar, Cupertino, CA (US); Teemu Koponen, San Francisco, CA (US); Anupam Chanda, San Jose, CA (US); Benjamin L. Pfaff, Redwood City, CA (US)

(73) Assignee: NICIRA, INC., Palo Alto, CA (US)

(*) Notice: Subject to any disclaimer, the term of this patent is extended or adjusted under 35 U.S.C. 154(b) by 818 days.

(21) Appl. No.: 14/958,186

(22) Filed: Dec. 3, 2015

(65) Prior Publication Data
US 2016/0301655 A1 Oct. 13, 2016

Related U.S. Application Data

(60) Provisional application No. 62/144,242, filed on Apr. 7, 2015.

(51) Int. Cl.
*H04L 29/12* (2006.01)
*H04L 12/721* (2013.01)

(52) U.S. Cl.
CPC .......... *H04L 61/103* (2013.01); *H04L 45/38* (2013.01); *H04L 61/6009* (2013.01); *H04L 61/6022* (2013.01)

(58) Field of Classification Search
CPC ... H04L 45/38; H04L 61/103; H04L 61/6009; H04L 61/6022

(Continued)

(56) References Cited

U.S. PATENT DOCUMENTS 6,751,221 B1 * 6/2004 Saito .................. H04L 12/2803
370/392
7,660,287 B2 * 2/2010 Axelsson .......... H04L 29/12009
370/338

(Continued)

OTHER PUBLICATIONS

David Plummer, RFC 826: An Ethernet Address Resolution Protocol, Nov. 1982, Network Working Group.*

*Primary Examiner* — Tonia L Dollinger
*Assistant Examiner* — Schquita D Goodwin
(74) *Attorney, Agent, or Firm* — Adeli LLP

(57) ABSTRACT

A method of suppressing ARP packets in a logical network comprising a set of data compute nodes (DCNs). The DCNs are hosted on a set of physical hosts. Each DCN has a protocol address and is connected to a forwarding elements (FE) on the corresponding host. Each FE has a set of flows that specifies a set of conditions to match a set of fields of each received packet and a set of actions to take on a packet that matches the set of conditions. An FE on a physical host receives a packet sent by a first DCN on the physical host and determines that the received packet is an ARP request packet by matching a set of fields in the packet with a set of conditions of a particular flow. The ARP request packet identifies a protocol address of a second DCN on the logical network. The PFE utilizes the actions specified by the particular flow to determine a corresponding hardware address for the target protocol address by searching an address-mapping table that maps the protocol address of each DCN to a corresponding hardware address. The PFE converts the ARP request packet to an ARP reply packet utilizing the set of actions specified by the particular flow, the ARP reply packet comprising the determined target address as a resolution of the ARP request. The PFE sends the ARP reply packet to the first DCN without broadcasting the ARP request to any DCNs on the logical network.

22 Claims, 14 Drawing Sheets

(58) Field of Classification Search
USPC .......................................................... 709/245
See application file for complete search history.

(56) References Cited

U.S. PATENT DOCUMENTS

| | | | | |
|---|---|---|---|---|
| 9,992,106 B2* | 6/2018 | Wang | ..................... | H04L 67/148 |
| 10,142,160 B1* | 11/2018 | Adams | ..................... | H04L 41/12 |
| 2003/0037163 A1* | 2/2003 | Kitada | ................ | H04L 12/4645 |
| | | | | 709/236 |
| 2007/0110068 A1* | 5/2007 | Sekiguchi | ......... | H04L 29/12028 |
| | | | | 370/392 |
| 2008/0080512 A1* | 4/2008 | Gofman | ............ | H04L 29/12028 |
| | | | | 370/392 |
| 2009/0025077 A1* | 1/2009 | Trojanowski | ........ | G06Q 20/027 |
| | | | | 726/11 |
| 2009/0028144 A1* | 1/2009 | Blair | ....................... | H04L 43/18 |
| | | | | 370/389 |
| 2010/0141402 A1* | 6/2010 | Eun | ........................ | H04L 41/12 |
| | | | | 340/10.41 |
| 2011/0299537 A1* | 12/2011 | Saraiya | .............. | H04L 61/2596 |
| | | | | 370/392 |
| 2011/0317703 A1* | 12/2011 | Dunbar | ................ | H04L 12/462 |
| | | | | 370/392 |
| 2013/0034097 A1* | 2/2013 | Dharmapurikar | ..... | H04L 45/026 |
| | | | | 370/390 |
| 2013/0044636 A1* | 2/2013 | Koponen | ................ | H04L 47/12 |
| | | | | 370/254 |
| 2013/0044754 A1* | 2/2013 | Zhu | ................... | H04L 29/12028 |
| | | | | 370/392 |
| 2013/0061047 A1* | 3/2013 | Sridharan | ........... | H04L 12/4666 |
| | | | | 713/162 |
| 2013/0308641 A1* | 11/2013 | Ackley | ............... | H04L 45/7457 |
| | | | | 370/392 |
| 2015/0016469 A1* | 1/2015 | Ganichev | ................ | H04L 49/90 |
| | | | | 370/429 |
| 2015/0032691 A1* | 1/2015 | Hall | ....................... | H04L 29/06 |
| | | | | 707/610 |
| 2015/0043581 A1* | 2/2015 | Devireddy | .............. | H04L 49/70 |
| | | | | 370/392 |
| 2015/0058968 A1* | 2/2015 | Wang | .................. | H04L 63/0281 |
| | | | | 726/12 |
| 2015/0106489 A1* | 4/2015 | Duggirala | ........... | H04L 61/2503 |
| | | | | 709/222 |
| 2015/0215265 A1* | 7/2015 | Lim | ....................... | H04L 61/103 |
| | | | | 370/390 |
| 2015/0312118 A1* | 10/2015 | Behera | .................... | H04L 45/26 |
| | | | | 370/241 |
| 2015/0350043 A1* | 12/2015 | Kovacs | ................... | H04L 12/28 |
| | | | | 370/245 |
| 2016/0173441 A1* | 6/2016 | Lee | ..................... | H04L 61/2092 |
| | | | | 709/220 |
| 2016/0226817 A1* | 8/2016 | Kang | ................... | H04L 61/103 |

* cited by examiner

ADDRESS RESOLUTION PROTOCOL SUPPRESSION USING A FLOW-BASED FORWARDING ELEMENT

CLAIM OF BENEFIT TO PRIOR APPLICATIONS

This application claims the benefit of U.S. Provisional Patent Application 62/144,242, filed Apr. 7, 2015. U.S. Provisional Patent Application 62/144,242 is incorporated herein by reference.

BACKGROUND

In IP networking the Address Resolution Protocol (ARP) is used to resolve the hardware address (MAC address) of a target protocol address (IP address). An ARP request is a broadcast in the subnet of the target protocol address. Thus, the ARP request reaches every node with an IP address in that subnet. In a virtualized network environment, a logical subnet may span to hundreds or even thousands of hypervisors hosting virtual interfaces belonging to that logical subnet. Any ARP request from a virtual interface in that logical subnet is replicated by the network virtualization layer to all hypervisors hosting virtual interfaces of that logical subnet. These broadcast traffic consumes resources such as CPU on the hosts and bandwidth in the datacenter network.

In addition, broadcast traffic can also be easily eavesdropped by any entity in the network. ARP is a trusting protocol and was not designed to cope with malicious hosts. The lack of authentication mechanism makes the protocol vulnerable to ARP poisoning and spoofing. An attacker can build fake ARP replies to compromise hosts' ARP cache, and then perform attacks such as man-in-the-middle, host impersonation, denial-of-service (DoS), etc.

Previous approaches included trapping ARP request packets and forwarding them to a local controller process that runs on the hypervisor. In this approach, a local controller process obtains an ARP resolution table from a central network controller and injects a reply packet to the forwarding element (or logical switch) by using the information in the ARP resolution table. The forwarding element then forwards the reply packet to the original sender of the ARP request. This approach has the following disadvantages. Trapping the packet and processing it by a controller in user level creates latency. The approach is resource intensive because a reply packet needs to be generated. Implementing and deploying the controller that does ARP suppression needs is resource intensive from a software engineering and deployment point-of-view.

BRIEF SUMMARY

Some embodiments provide a method of matching ARP requests at a forwarding element (e.g., logical switch) of a virtualization software of a host machine and locally converting each request packet to a reply packet without broadcasting the ARP request to other nodes in the same subnet or generating a reply packet outside the forwarding element.

A network controller maintains an address-mapping table that maps the protocol address (e.g., IP address) of each node in a subnet to the node's corresponding hardware address (e.g., MAC address). The network controller pushes the address-mapping table to each host's virtualization software.

To process packets, the forwarding element maintains a number of flows in a flow table. Each flow is a rule that specifies how the forwarding element should process each packet with certain header field values. The flow includes a set of match fields and at least one action to perform on each packet that has a set of header values that match the set of match field values. Typically, the action specifies dropping the packet or outputting the packet to one or more of the forwarding element's output ports.

The forwarding element receives a flow with a set of match fields to match a set of fields of ARP request broadcasts. ARP requests are broadcasted by nodes of a network to get the hardware address (referred to as target hardware address) associated with the protocol address (referred to as target protocol address) of another node.

Each ARP request includes a target protocol address for which a matching target hardware address is requested. The action associated with the flow specifies searching the address-mapping table to find the target protocol address identified in the ARP request. The target hardware address associated with the target protocol address found in the table is the ARP resolution (it is the hardware address for which the ARP request was initiated).

The action in the flow also converts the ARP request packet to an ARP reply packet by changing the packet operation code from ARP request to ARP reply, moving the source fields of the packet to the corresponding target fields, and supplying the requested hardware address in the source hardware address. The forwarding element then returns the reply packet to the node that has sent the ARP request. When there is no match for the target protocol address in the address-mapping table, the action in the flow drops the ARP request.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

ARP is a protocol used for resolution of Open Systems Interconnection (OSI) model Layer 3 (logical layer 3 or network layer) addresses into OSI Layer 2 (logical layer 2 or link layer) addresses. For instance, ARP is used to resolve a protocol address such as an IP address into a hardware address such as a MAC address. An ARP request packet is broadcasted by a node that has the Layer 3 and requires the Layer 2 address to send out a packet. The ARP request is sent to every node in a subnet. This broadcast traffic consumes resources such as CPU on the hosts and bandwidth in the datacenter network.

Some embodiments utilize a flow-based forwarding element to match ARP requests at the forwarding element and locally convert each request packet to a reply packet within the forwarding element (i.e., in the data path) without broadcasting the ARP request to other nodes or generating a reply packet outside the forwarding element. When there is no match for the target protocol address in the address-mapping table, the action in the flow drops the ARP request. In either case, the ARP broadcast packet does not leave the forwarding element.

I ARP Suppression at Flow-Based Forwarding Elements

Figure 1:
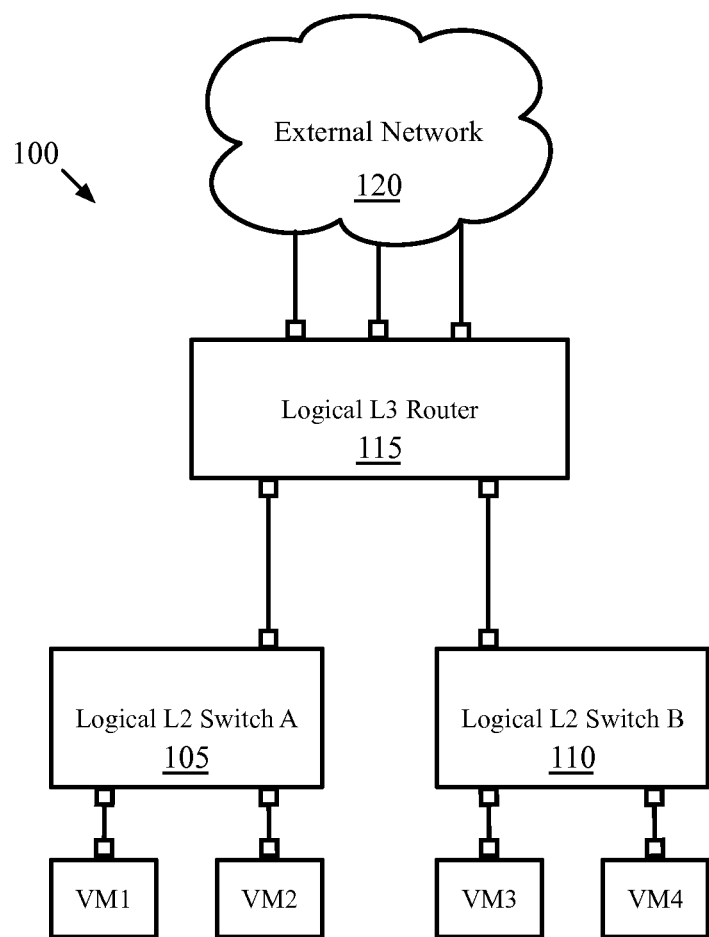
FIG. 1 conceptually illustrates a logical network architecture of some embodiments that includes a logical router.

FIG. 1 conceptually illustrates an example of a logical network architecture 100. The logical network 100 includes two logical forwarding elements (LFEs) 105 and 110 and a logical router 115. Each of the LFEs 105 and 110 connects several virtual machines. In this example, two virtual machines (VMs) are connected by each LFE and the logical router 115 connects the two LFE (i.e., logical layer 2 domains) together. In addition, the logical router connects the logical network to an external network 120, via three logical ports. While in this example, the logical router 115 has several ports connecting to the external network (e.g., as uplink ports). In some embodiments the logical router only has a single port that connects to the external networks.

In some embodiments, the logical network is an abstract conception of a network generated by an administrator, and the logical network is implemented in a virtualized, distributed manner in a managed physical infrastructure (e.g., in a multi-tenant datacenter). That is, the virtual machines that connect to the LFEs may reside on various different host machines within the infrastructure, and physical forwarding elements (PFEs) (e.g., software virtual switches) operating on these host machines implement some or all of the logical forwarding elements (logical switches, logical routers, etc.). In the virtualization field, some refer to software switches as virtual switches as these are software elements. However, in this specification, the software forwarding elements are referred to as PFEs, in order to distinguish them LFEs, which are logical constructs that are not tied to the physical world. A PFE forwards packets in a physical network whether or not it is implemented in software while an LFE forwards packets in a logical network, which is logically decoupled or abstracted from the physical network. In other words, the software forwarding elements are referred to as PFEs because they exist and operate in the physical world, whereas an LFE is a logical representation of a forwarding element that is presented to a user when designing a logical network.

A logical router, such as logical router 115, connects a set of LEFs to which VMs logically attach. Each LEF represents a particular set of IP addresses (i.e., a subnet), and is implemented in the managed network across a set of PFEs to which the VMs physically connect (e.g., through virtual interfaces). In some embodiments, the logical routers are implemented in a distributed fashion as well by the PFEs that connect to the virtual machines. However, when the logical router also connects to the external network via one or more ports, these connections to the external network are implemented through the use of one or more gateways. The gateways, in some embodiments, are responsible for both sending data traffic from the managed network to the external unmanaged physical network and processing traffic sent from the external network into the managed network.

Figure 2:
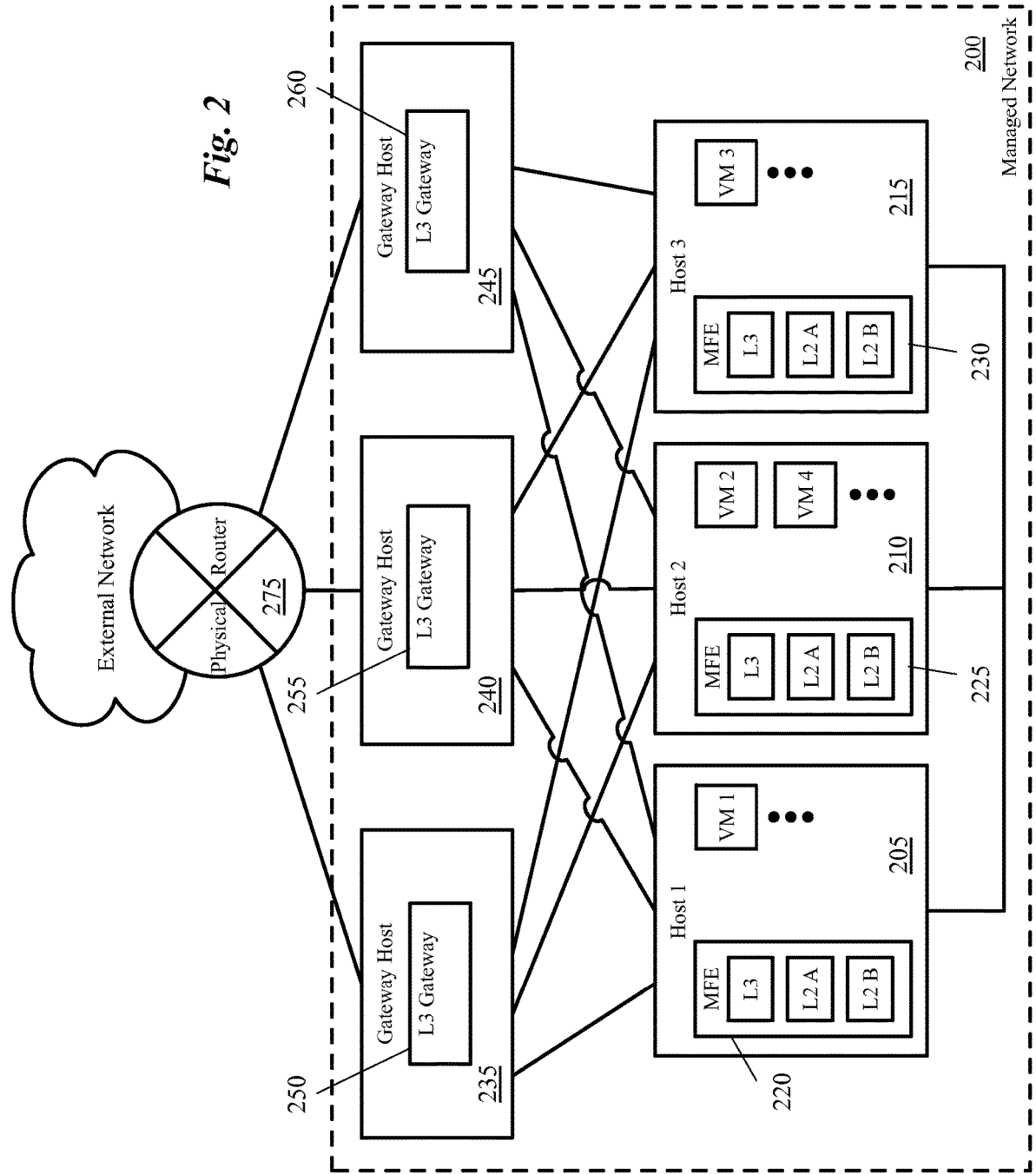
FIG. 2 conceptually illustrates a physical implementation of the logical network of FIG. 1.

FIG. 2 conceptually illustrates such a physical implementation of the logical network 100. This figure illustrates a managed network 200 that includes three host machines 205-215 and three gateway host machines 235-245. The VMs of the logical network 100 reside on the hosts 205-215, implemented on top of virtualization software (e.g., a hypervisor, virtual machine monitor, etc.) that operates in the host. Additional virtual machines that connect to other logical networks may reside on some or all of these hosts, as well as additional hosts in the managed network that are not shown in this figure.

In addition to the virtual machines, each of the hosts 205-215 operates a physical forwarding element (PFE) 220-230. In some embodiments, this PFE is a virtual switch that operates within the virtualization software of the host (e.g., Open VSwitch, or another software forwarding element).

In the example illustrated in FIG. 2, the PFEs 220-230 each implement both of the LFEs 105 and 110, as well as the logical router 115. This enables first-hop logical processing in some embodiments, in which all or most of the logical processing for a packet is performed at the first PFE that receives the packet. Thus, a packet sent from VM 1 to VM 4 would be processed, by the PFE 220, through LFE 105 to logical router 115 and then to LFE 110. The PFE 220 would identify the logical egress port of LFE 110 for the packet as the port to which VM 4 attaches, and map this egress port to a tunnel to the PFE 230 at host 210.

In some embodiments, a network controller (or controller cluster) provisions the PFEs 220-230 by generating flow entries, or data tuples that the PFE converts into flow entries. These flow entries specify matching conditions (e.g., physical ingress port, logical ingress port, destination MAC or IP addresses, transport layer 5-tuples, etc.) and actions to take on a packet that matches the conditions (e.g., assign packet to a LFE, assign a logical egress port, write data to register, encapsulate in a particular tunnel, etc.). Thus, in order for the PFE to process a packet through the logical network, the PFE matches the packet to a first flow entry, performs the action (e.g., to modify the packet or store logical context data in a register for the packet), resubmits the packet in order to match another flow entry, etc.

The gateway host machines 235-245 of some embodiments host L3 gateways 250-260 for the logical network 100 that implement the connections between the external network 120 and the logical network 100 (specifically, the logical router 115). When the physical router 275 receives a packet with a destination address that corresponds to one of the VMs of the logical network 100, or a public IP shared by the VMs on a logical switch, the physical router 275 sends the packet to one of the gateway hosts 235-245. The gateway hosts 235-245 also include PFEs, and in some embodiments these PFEs receive packets from the physical router 275 and hand off the packets to the L3 gateway in their respective host for processing.

In some embodiments, a user (e.g., an administrator) configures the logical network 100. Upon receiving such a configuration with several logical router ports connecting to the external network, a network controller (or controller cluster) selects the set of gateway host machines 235-245 for implementing this connection. Specifically, some embodiments select a different gateway host machine for each of these logical router ports. In some embodiments, these gateways are spread across clusters of gateways in the network, such that each port is implemented in a different failure domain. The network controller calculates a routing table for the logical router, a portion of which is implemented at the gateway host machines and a portion of which is implemented by the PFEs (e.g., the PFEs 220-230 and those on the gateway host machines 235-245).

Figure 3:
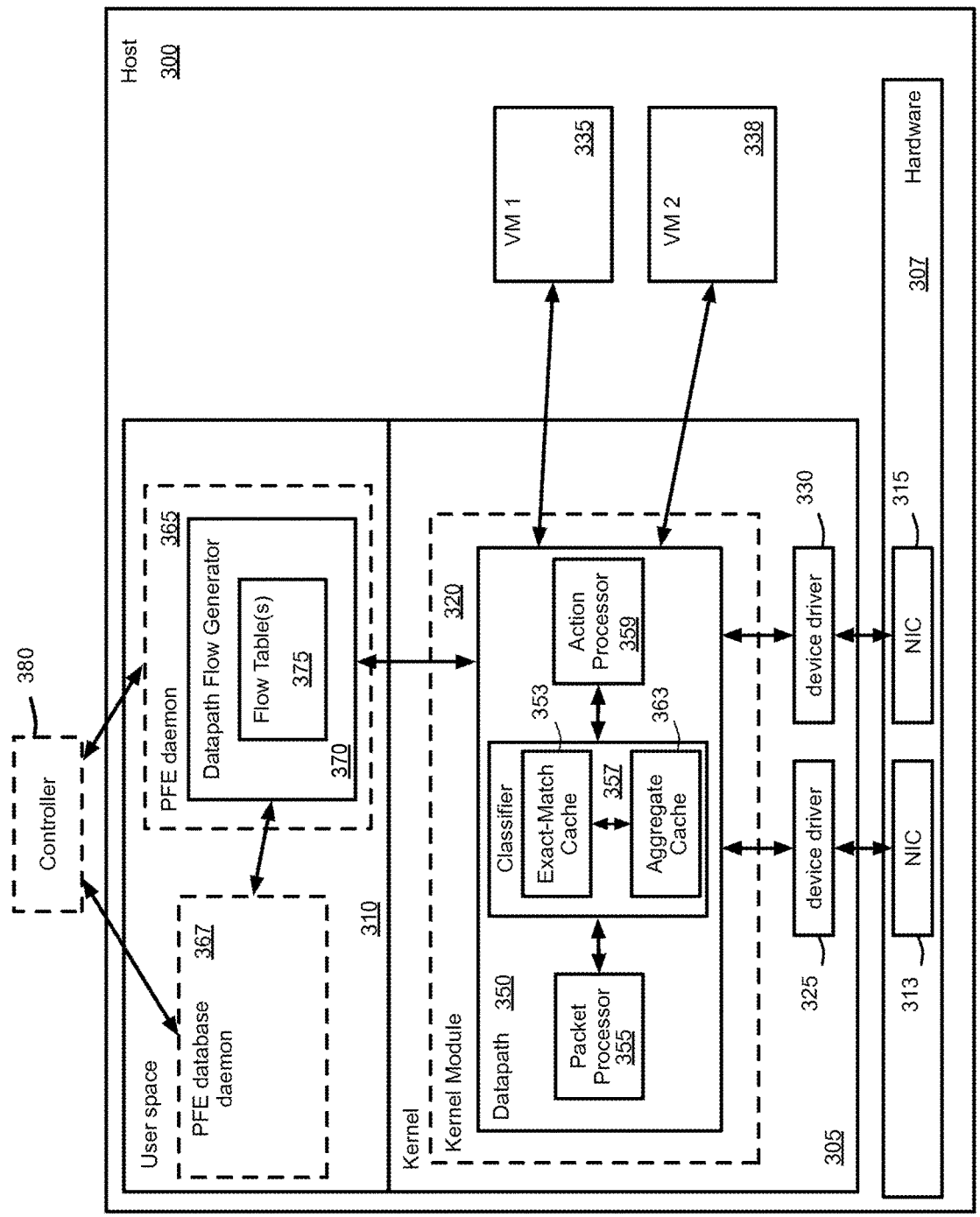
FIG. 3 conceptually illustrates an architectural diagram of a host machine on which a software-implemented PFE of some embodiments is implemented.

FIG. 3 conceptually illustrates an architectural diagram of a host machine 300 on which a software-implemented PFE of some embodiments is implemented. In some embodiments, the PFE is implemented in the virtualization software of the host 300. In this example, the PFE includes several components, including a kernel module 320 (operating in the virtualization software kernel 305) as well as a PFE daemon 365 and PFE database daemon 367 (both of which operate in the user space 310 of the virtualization software).

While this figure and the accompanying descriptions show the datapath (i.e., the parsing and extraction of packet headers, the lookups against cached flow entries, and the execution of actions on the packets) operating in the kernel, it should be understood that these could also take place in the userspace in some embodiments. That is, in some embodiments, all three layers of the packet classification hierarchy (exact-match cache, aggregate cache, and staged forwarding tables) run in the userspace (possibly within a single userspace process).

As shown in FIG. 3, the host 300 includes hardware 307 (though this is a software architecture diagram, the hardware 307 is displayed in order to represent the NICs 313 and 315 of the host machine), virtualization software kernel 305, virtualization software user space 310, and two VMs 335 and 338. The hardware 307 may include typical computer hardware (e.g., processing units, volatile memory (e.g., RAM), nonvolatile memory (e.g., hard disk, optical disks, solid-state memory, etc.), network adapters, etc. As shown, the hardware 307 also includes network interface controllers (NICs) 313 and 315 for connecting a computing device to a network.

The virtualization software that includes the kernel 305 and user space 310 is a software abstraction layer that operates on top of the hardware 307 and below any operating system in some embodiments. In some embodiments, the kernel 305 performs virtualization functionalities (e.g., to virtualize the hardware 307 for several virtual machines operating on the host machine). The kernel 305 handles various management tasks, such as memory management, processor scheduling, or any other operations for controlling the execution of the VMs 335 and 338 operating on the host machine.

As shown, the kernel 305 includes device drivers 325 and 330 for the NICs 313 and 315, respectively. The device drivers 325 and 330 allow an operating system to interact with the hardware of the host 300. The VMs 335 and 338 are independent virtual machines operating on the host 300, and may run any number of different operating systems (e.g., Linux, Solaris, FreeBSD, or any other type of UNIX based operating system, Windows-based operating systems, etc.). While this figure shows an example in which the PFE operates within the virtualization software of the host and the VMs 335 and 338 operate on top of that virtualization software, it should be understood that the caching hierarchy is equally possible in embodiments in which the PFE is not part of any virtualization software (e.g., in non-virtualized environments). In some such embodiments, no virtualization software is present on the host machine, and thus VMs are not present (instead, packets may simply be forwarded between NICs.

The user space 310 of the virtualization software includes the PFE daemon 365 and the PFE database daemon 367. The PFE daemon 365 is an application that runs in the background of the user space 310. The PFE daemon 365 of some embodiments receives configuration data from the network controller 380 (which may be a chassis controller operating on the host, or a network controller operating on a separate physical machine to manage several host machines) and the PFE database daemon 367. For instance, from the controller, the PFE daemon 365 of some embodiments receives generated flow entries that specify packet processing operations to apply to packets when the packets match a set of conditions. The PFE daemon 365 stores the received flow entries in the flow tables 375. In some embodiments, the flow tables are organized in stages (e.g., stages of packet processing), with one or more stages for each of several logical forwarding elements. For instance, a logical switch might have an ingress mapping stage, an ingress ACL stage, a logical forwarding stage, an egress ACL stage, etc.). For a PFE implementing multiple logical networks, each of the logical networks has several stages of flow tables in some embodiments.

In some embodiments, the PFE daemon 365 communicates with the network controller 380 using the OpenFlow Protocol, while the PFE database daemon 367 communicates with the network controller 380 through a database communication protocol (e.g., OVSDB protocol). The database protocol of some embodiments is a JavaScript Object Notation (JSON) remote procedure call (RPC) based protocol.

The PFE database daemon 367 is also an application that runs in the background of the user space 310 in some embodiments. The PFE database daemon 367 of some embodiments communicates with the network controller 380 in order to configure certain aspects of the PFE (e.g., of the PFE daemon 365 and/or the kernel module 320) other than the installation of flow entries. For instance, the PFE database daemon 367 receives management information from the network controller 380 for configuring bridges, ingress ports, egress ports, QoS configurations for ports, etc., and stores the information in a set of databases that help define the configuration of the PFE.

As illustrated in FIG. 3, the kernel 305 includes the kernel module 320. This module processes and forwards network data (e.g., packets) between VMs running on the host 300 and network hosts external to the host (e.g., network data received through the NICs 313 and 315). In some embodiments, the VMs 335 and 338 running on the host 300 couple to the kernel module through a datapath 350.

In some embodiments, the datapath 350 manages a set of rules (e.g., flow entries) that specify operations for processing and forwarding packets. The datapath 350 communicates with the PFE daemon 365 in order to process and forward packets that the datapath 350 receives. In the example of FIG. 3, the datapath 350 includes a packet processor 355, a classifier 357, and an action processor 359. The packet processor 355 receives a packet and parses the packet to strip header values. The packet processor 355 can perform a number of different operations. For instance, in some embodiments, the packet processor 355 is a network stack that is associated with various network layers to differently process different types of data that it receives. Irrespective of all the different operations that it can perform, the packet processor 355 passes the header values to the classifier 357. In some embodiments, the packet processor stores these header values in one or more registers that are stored for a packet. In some embodiments, the packet processor 355 defines an object for the packet that includes the registers. The packet object is then used to represent the packet in the PFE.

The classifier 357 accesses one or more datapath caches (also referred to as a flow cache) to find matching flow entries for different packets. In some embodiments, as shown in the figure, the classifier includes two types of flow cache, an aggregate cache 363 and an exact-match cache 353. The exact-match cache 353 of some embodiments contains flow entries that are matched by packets having a unique set of header values (i.e., packets from a specific data flow or connection). In some embodiments, the flow entries in the exact-match cache 353 are installed by the classifier 357 based on (i) processing of a packet through the set of flow tables 0375 by the PFE daemon 365 or (ii) processing of a packet according to a matched flow entry in the aggregate cache 363. The aggregate cache 363 contains flow entries, each of which is matched by packets falling into a particular traffic aggregate class. That is, each of the flow entries in the aggregate cache 363 specifies a subset of the packet header values for which it requires a match, with the other packet header fields being wildcarded (i.e., a packet can match the flow entry while having any values for the wildcarded fields). In some embodiments, the flow entries in the aggregate cache 163 are installed by the classifier 357 based on processing of a packet through the set of flow tables 175 by the MFE daemon 365.

When the classifier 357 receives the header values for a packet, it first performs a lookup on the exact-match cache 353 to find a flow entry matched by the packet. When none is found, the classifier 357 next performs a lookup on the aggregate cache 363 to find a matching flow entry there. When no matching flow entries can be found (i.e., for the first packet of a data flow is different enough from the previously-received data flows so that the packet does not match any of the flow entries in the aggregate cache 363), the PFE shifts control of the packet processing to the PFE Daemon 365 for a full set of packet processing operations (i.e., executing of numerous lookup stages over the flow tables 375, which is more computationally expensive). One primary distinction between the caches 353 and 363 and the set of flow tables 375 is that there is at most only one matching flow entry in each of the two fast path caches (only one of which will actually be matched by the flow entry, based on the hierarchy of traversal through the caches). The cached flow entries specify all of the actions to take in order to process the packet, whereas each of the flow entries in the tables 375 only specify the actions for that stage, often specifying a resubmit action for processing by the next packet processing stage.

If the classifier 357 finds a matching flow entry in one of the caches, the action processor 359 receives the packet and performs a set of actions specified by the matching flow entry. When a packet requires processing by the PFE daemon 365, the action processor 359 of some embodiments receives, from the PFE daemon 365, the packet and a set of instructions for actions to perform on the packet.

The PFE daemon 365 of some embodiments includes a datapath flow generator 370. The datapath flow generator 370 is a component of the PFE that makes forwarding and other packet processing decisions. For any packet that is not matched in the datapath caches 353 and 363 (e.g., because the packet is the first in a new transport-layer connection), the datapath flow generator 370 performs the one or more flow table lookups required to process the packet, and then generates new flow entries to install in the caches 353 and 363. In some embodiments, the datapath flow generator includes or works in conjunction with a separate classifier (not shown) in order to find one or more matching flow entries in the flow tables 375. Unlike the classifier 357, the PFE daemon 365 may perform one or more resubmits (i.e., be resubmitted back to the classifier with packet data modified based on actions performed by previous matched flow entries).

It should be understood that the architecture shown in FIG. 3 is an example architecture and that different embodiments can include different sets of components. The naming of the various components is arbitrary and can change from one implementation to another. Also, the architecture shows two different layers (e.g., the kernel layer and the user space layer) performing various operations. In some embodiments, these operations occur at just one layer (e.g., at the user space layer) or are further split into other layers.

A Traditional ARP Requests and Replies

Figure 4:
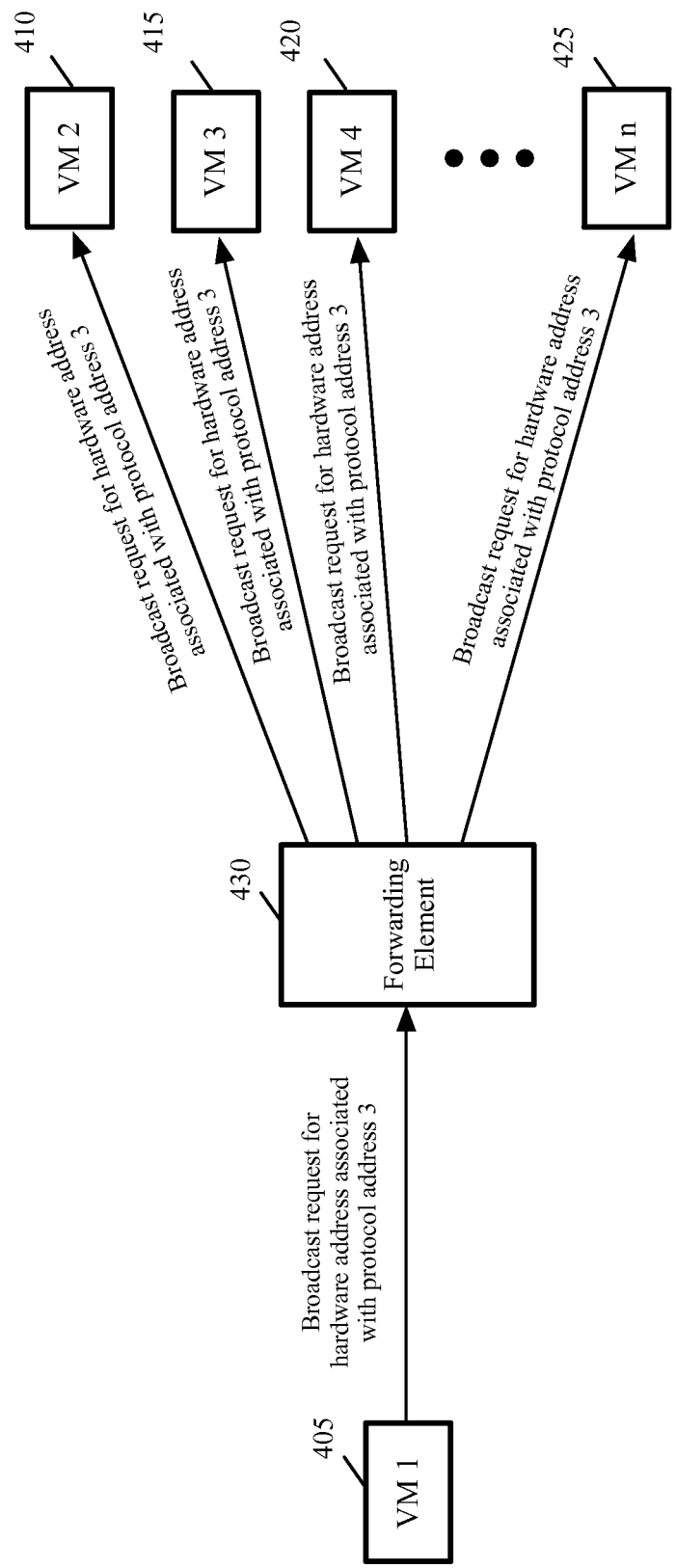
FIG. 4 conceptually illustrates an ARP request sent from a network node according to prior art.

FIG. 4 conceptually illustrates an ARP request sent from a network node according to prior art. The virtual machines VM 1 to VM n 405-425 are network nodes of the same logical network. VM 1 to VM n 405-425 can be on the same or on different hosts. The forwarding element 430 in this example is an LFE that is implemented from several PFEs distributed on different hosts throughout the network to implement the logical network.

As shown, VM 1 is broadcasting a request for hardware address associated with protocol address 3. In this example, the protocol address is an Internet protocol (IP) address of VM 3. VM 1 is broadcasting the request in order to receive the hardware address of VM 3. In this example, the hardware address is the media access control (MAC) address associated with the IP address identified in the broadcast message. The forwarding element 430 sends the broadcast message received from node 405 to every other node 410-425 in the logical network.

Figure 5:
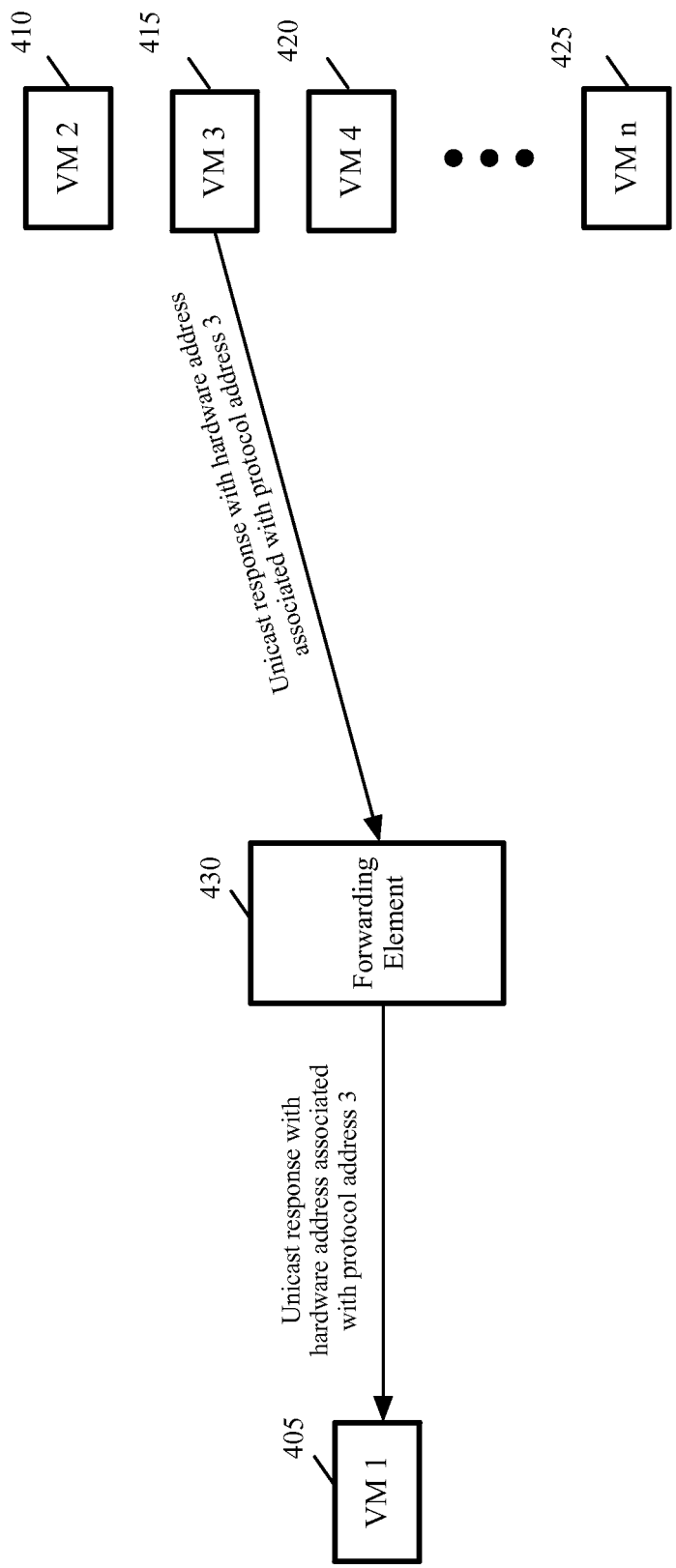
FIG. 5 conceptually illustrates an ARP reply sent according to prior art from one of the logical network nodes in response to the ARP request of FIG. 4.

FIG. 5 conceptually illustrates an ARP reply sent according to prior art from one of the logical network nodes in response to the ARP request of FIG. 4. Each node 410-425, which received the broadcasted ARP request in FIG. 4 compares the IP address identified in the ARP request with its own IP address.

In the example of FIG. 5, the IP address of nodes 410 and 420-425 does not match the IP address identified in the ARP request. As shown in FIG. 5, nodes 410 and 420-425 ignore the ARP request. On the other hand, node 415 determines that the IP address identified in the ARP request matches its IP address. Node 415 replies with a unicast response that includes the MAC address of node 415. The forwarding element 430 receives the reply and forwards the reply to node 405. As can be seen from FIGS. 4-5, broadcasting the ARP request requires sending ARP packets to every node in the network which create traffic and processing overhead.

B. Format of ARP Packets

Figure 6:
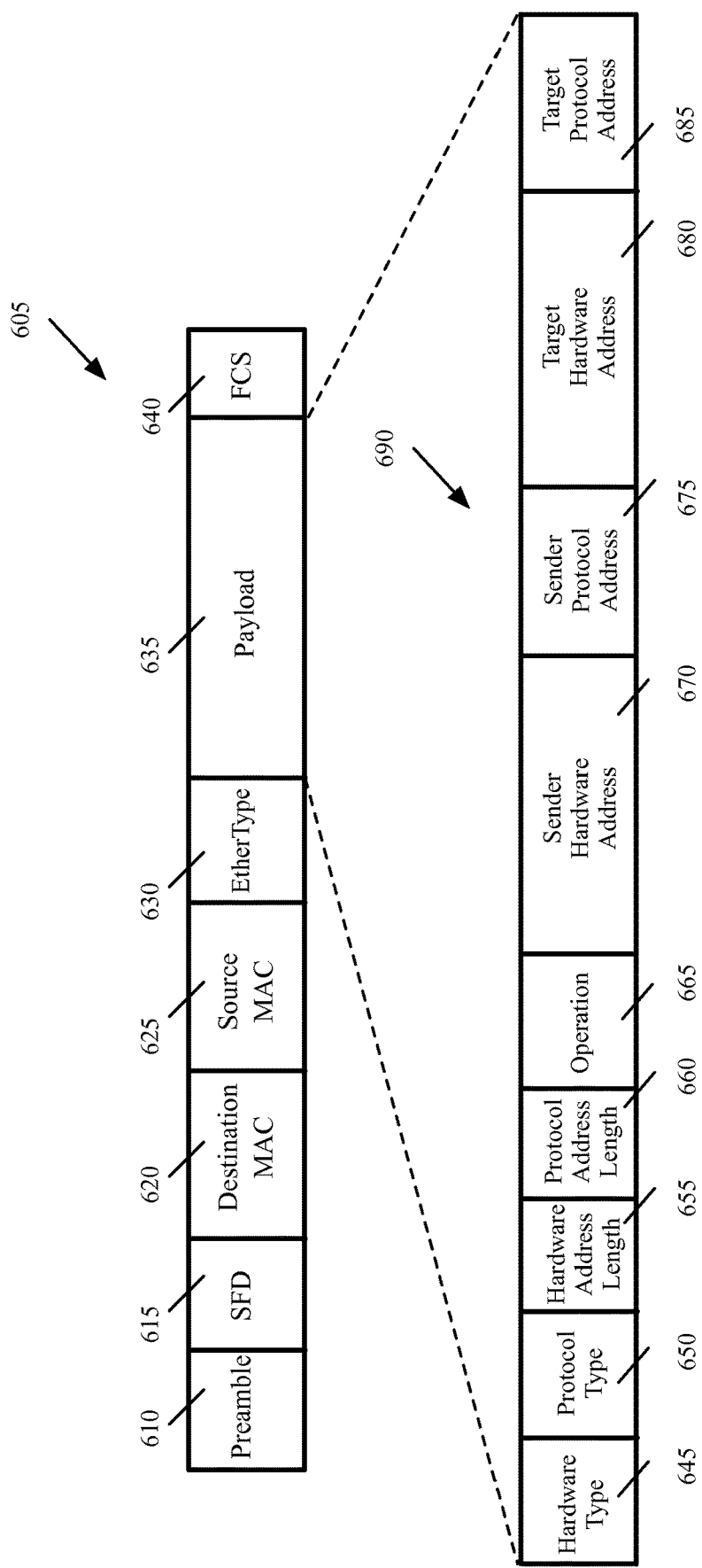
FIG. 6 illustrates the format of an ARP request embedded in an Ethernet packet in some embodiments.

In some embodiments, the ARP request is embedded in an Ethernet packet. FIG. 6 illustrates the format of an ARP request embedded in an Ethernet packet in some embodiments. As shown, the Ethernet packet 605 includes a preamble 610, a start frame delimiter (SFD) 615, a destination MAC address 620, a source MAC address 625, an Ethertype 630, a payload 635, and a frame check sequence (FCS) 640.

The SFD 615 marks the end of the preamble 610 and the beginning of the Ethernet Frame. The FCS is a cyclic redundancy check (CRC) of the Ethernet frame. The Ethertype 630 is set to a pre-determined value (e.g., the hexadecimal value 0x0806) to indicate that an ARP message is encapsulated in the payload 635.

The ARP packet encapsulated in the payload 635 is shown in the expanded view 690. The ARP packet includes hardware type (HTYPE) 645, protocol type (PTYPE) 650, hardware address length (HLEN) 655, protocol address length (PLEN) 660, operation (or Opcode) 665, sender hardware address (SHA) 670, sender protocol address (SPA) 675, target hardware address (THA) 680, and target protocol address (THA) 685. For an ARP packet encapsulated in an Ethernet packet, a predetermined value (e.g., 1) in HTYPE field 645 identifies the OSI Layer 2 network protocol type as Ethernet. PTYPE 650 identifies the OSI Layer 3 protocol type. For IPv4, this field is set to hexadecimal value 0x0800.

HLEN 655 indicates the length of the requested hardware address. PLEN 660 indicates the length of addresses used in the Layer 3 protocol. (e.g., IP version 4 (IPv4) protocol). The operation field 665 identifies the ARP operation. For example, a value of 1 specifies an ARP request and a value of 2 specifies an ARP reply.

SHA 670 is the MAC address of the sender. For an ARP request, SHA is the hardware address of the node sending the request. For an ARP reply, the SHA indicates the hardware address of the node that the ARP request was inquiring. The sender protocol address (SPA) 675 is the protocol address (e.g. the IP address) of the sender of the ARP packet.

THA 680 is the hardware address of the intended receiver of the ARP packet. In an ARP request, THA 680 is ignored. In an ARP reply, THA 680 indicates the hardware address of the node that originated the ARP request. TPA 685 is the protocol address (e.g., the IP address) of the intended receiver of the ARP packet.

C. Maintaining the Address-Mapping Table

Figure 7:
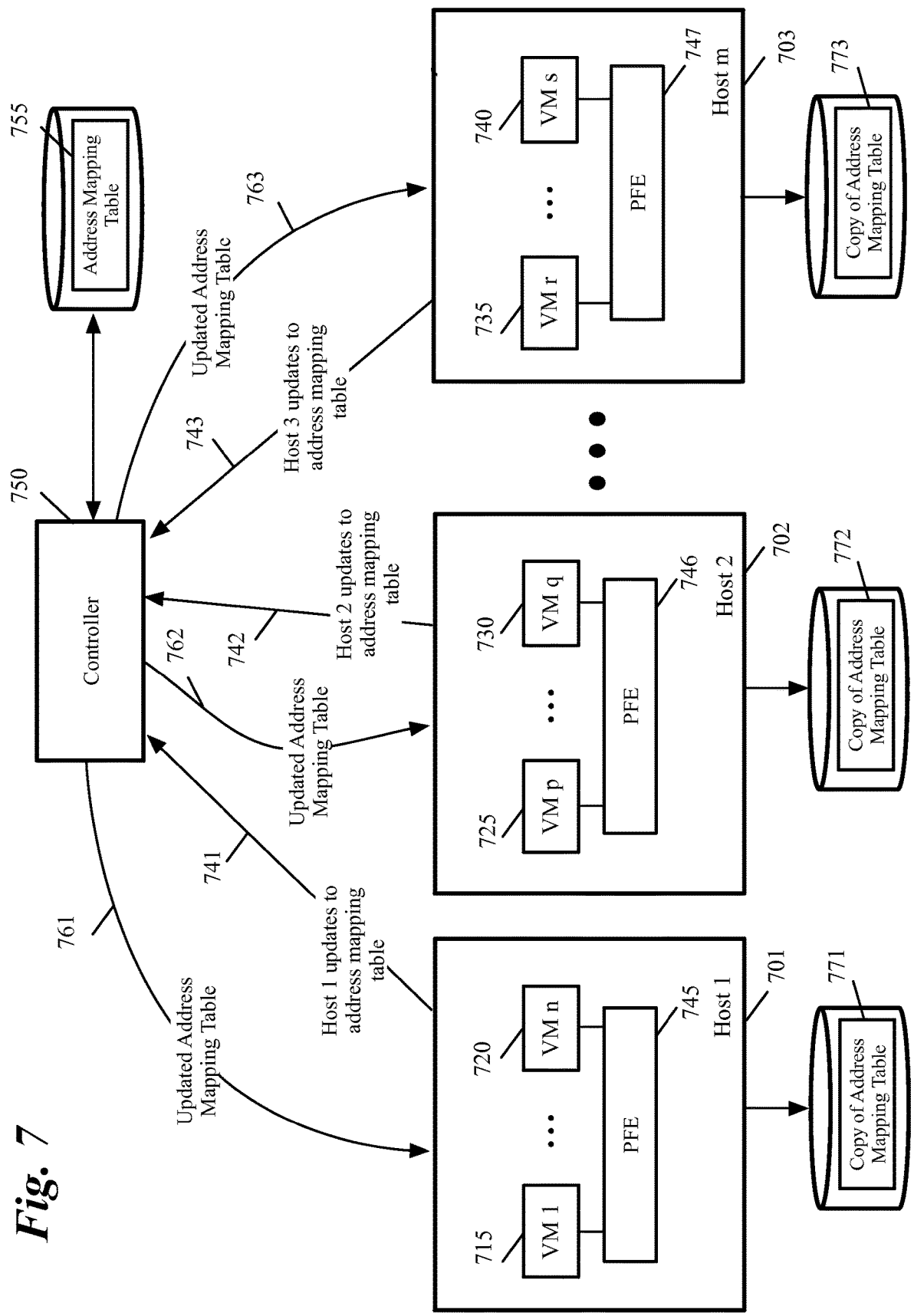
FIG. 7 conceptually illustrates a system for ARP suppression in some embodiments of the invention.

FIG. 7 conceptually illustrates a system for ARP suppression in some embodiments of the invention. The figure shows several hosts 701-703. Each host hosts several VMs 715-740. For simplicity, VMs of only one tenant are shown and some details of the virtualization software are not shown. Each host 701-703 includes a PFE 745-747. As shown, a controller (e.g., a network controller) 750 maintains an address-mapping (or ARP suppression) table 755 for the logical network. In some embodiments, the controller maintains one address-mapping table for each logical network. For simplicity, FIG. 7 only shows that address-mapping table 755 that the controller maintains for one logical network.

Figure 8:
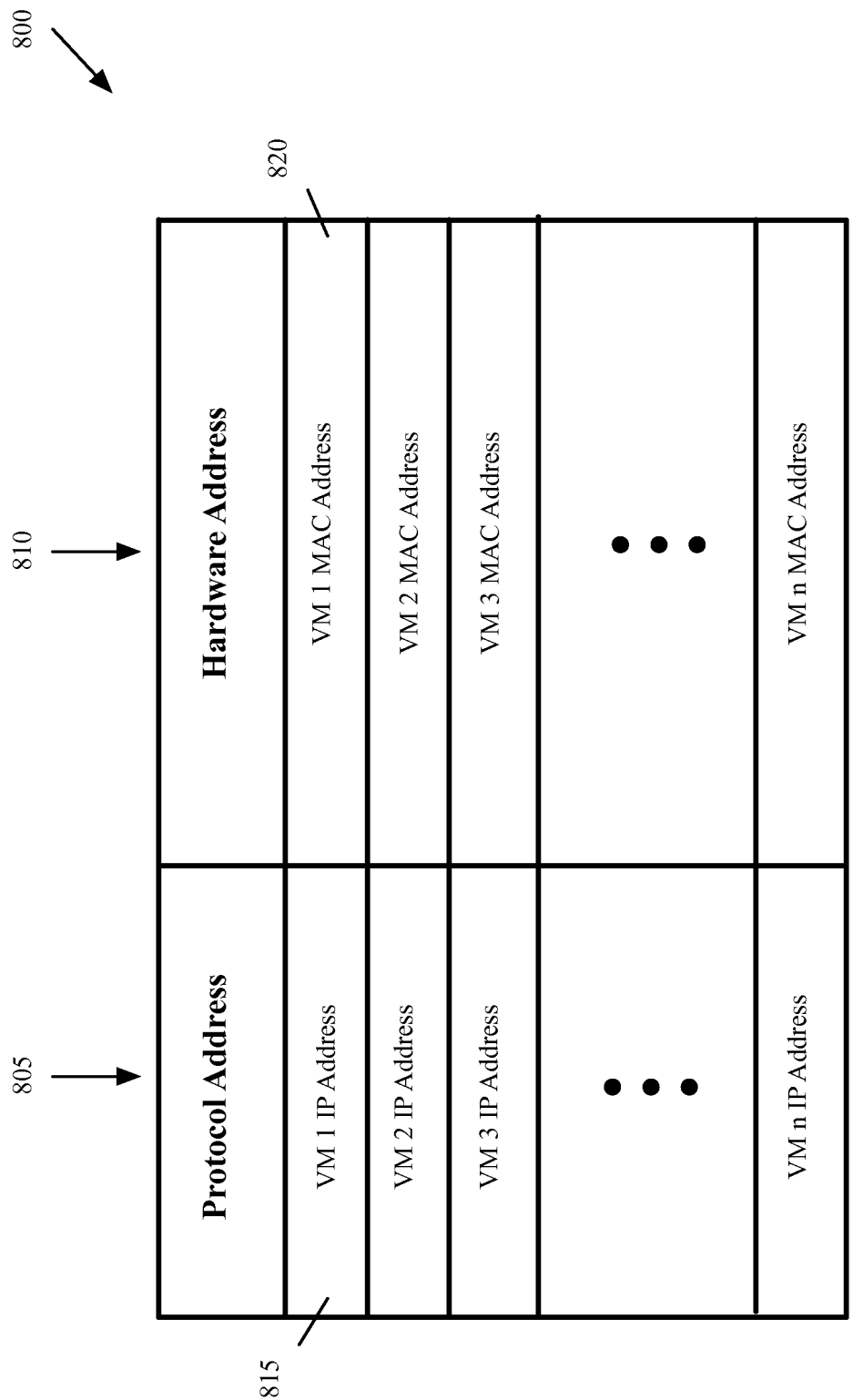
FIG. 8 conceptually illustrates the address-mapping table of some embodiments.

FIG. 8 conceptually illustrates the address-mapping table of some embodiments. As shown, the address-mapping table 800 maps the protocol address 805 of each node (e.g., each VM) in the logical network to the hardware address of the node 810. For instance, the IP address 815 of VM 1 (715 in FIG. 7) is mapped to the MAC address 820 of VM 1 715.

Referring back to FIG. 7, the controller 750 receives the local updates for the protocol address and hardware address of VMs from each host 701-703 (e.g., from the virtualization software of each host). Whenever a VM is added/removed or the protocol address to hardware address mapping of a VM on a host is changed, the virtualization software of the host sends (as shown by arrows 741-743) and update to controller 750. The local update includes the protocol address (e.g., IP address) and the hardware address (e.g., MAC address) of the added/removed/modified VM.

The controller 750 then updates the address-mapping table 755. The controller then sends (or pushes) the updated address-mapping table 755 (as shown by arrow 761-763) to the virtualization software of the hosts. In some embodiments, the controller only sends changes to the address-mapping table instead of sending the whole table in order to save bandwidth. In some embodiments, the controller does not send the changes to the virtualization software of the host that has reported the changes in order to save the bandwidth.

The virtualization software of each host 701-703 maintains a local copy 771-773 of the address-mapping table. The address-mapping tables 771-773 are utilized by the logical forwarding element 745-747 on each host to build the ARP reply packet.

Figure 9:
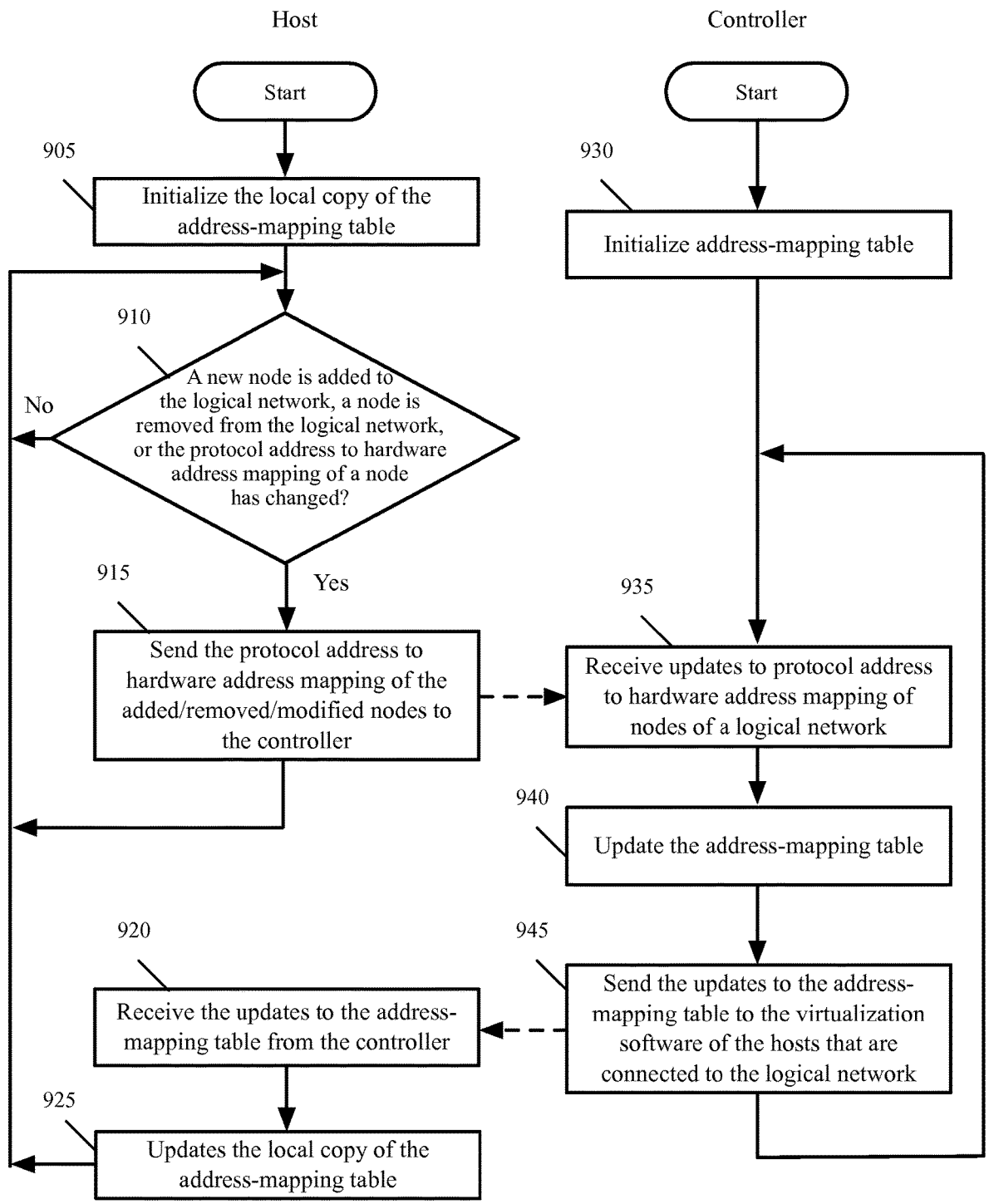
FIG. 9 is a swim lane diagram that conceptually illustrates different actions by the controller and the host virtualization software of each host for exchanging address-mapping information in some embodiments of the invention.

FIG. 9 is a swim lane diagram that conceptually illustrates different actions by the controller and the host (e.g., by the virtualization software of each host) for exchanging address-mapping information in some embodiments of the invention. The figure shows different processes performed by the controller and the host. As shown, the host initializes (at 905) the local copy of the address-mapping table maintained at the host. The controller also initializes (at 930) the address-mapping table maintained by the controller. For instance, the controller creates one address-mapping table for each logical network in the system.

The host then determines (at 910) whether there are any updates to the protocol address to hardware address (e.g., IP-MAC) mapping of the nodes on the virtualization software host. The host determines whether a new node is added to the logical network, a node is removed from the logical network, or the protocol address to hardware address mapping of a node has changed? If not, the host waits for the next update to the address mappings.

Otherwise, the host sends (at 915) the protocol address to hardware address mapping of the added/removed/modified nodes to the controller. For instance, the host sends the IP address and the MAC address of the node to the controller. The host then proceeds to 910, which was described above.

The controller receives (at 935) the updates to protocol address to hardware address mapping of the nodes in a logical network from the host. The controller updates (at 940) the address-mapping table maintained by the controller.

The controller then sends (at 945) the updates to the address-mapping table to the hosts that are on the connected to the same logical network. In some embodiments, the controller only sends changes to the address-mapping table instead of sending the whole table. In some embodiments, the controller does not send the changes to the host that has reported the changes. The controller then proceeds to 935, which was described above. The host receives (at 920) the updates to the address-mapping table from the controller.

The host updates (at 925) the local copy of the address-mapping table. The host then proceeds to 910, which was described above.

D. ARP Suppression

Figure 10:
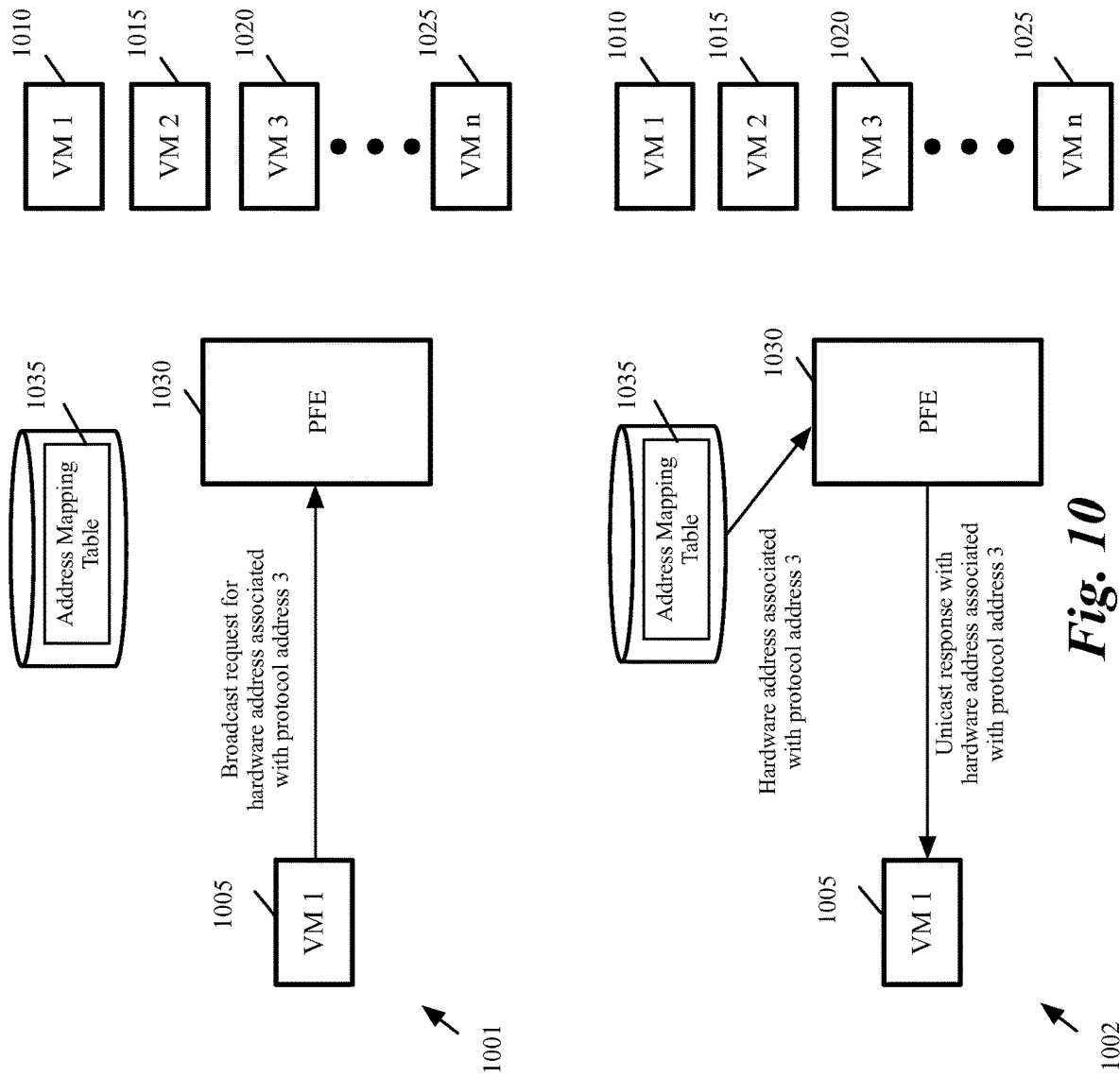
FIG. 10 conceptually illustrates suppression of ARP broadcasts in some embodiments of the invention.

FIG. 10 conceptually illustrates suppression of ARP broadcasts in some embodiments of the invention. The figure is shown in two stages 1001 and 1002. The virtual machines VM 1 to VM n 1005-1025 are network nodes of the same logical network. VM 1 to VM n 1005-1025 can be on the same or on different hosts. The forwarding element 1030 in this example is a PFE. An address-mapping table 1035 is utilized by the PFE for ARP suppression. The address-mapping table is similar to the local copy of address mapping-tables 771-773 described above by reference to FIG. 7.

Similar to VM 205 in FIG. 2, VM 1005 in stage 1001 is broadcasting a request for hardware address associated with protocol address 3. In this example, the protocol address is an Internet protocol (IP) address of VM 3. VM 1 is broadcasting the request in order to receive the hardware address of VM 3. In this example, the hardware address is the media access control (MAC) address associated with the IP address identified in the broadcast message.

However, unlike the forwarding element 230 in FIG. 2, the PFE 1030 in FIG. 10 does not forward the broadcast message to any other nodes on the network. As a part of the PFE 1030 configuration, the PFE has received a flow to match broadcast ARP packets. Once a match is found, the flow action converts the same ARP request packet to a unicast ARP reply packet that is sent back to the node that has sent the ARP request packet. In stage 1002, the PFE matches a set of fields in the ARP request with a set of values identified in the flow.

As shown in stage 1002 PFE 1035, based on the action specified in the flow, searches the address-mapping table 1035 to identify the hardware address associated with the target protocol address identified in the ARP request. For instance, the forwarding element indexes the address-mapping table with the target protocol address to identify the associated hardware address.

In this example, the target protocol address identified in the ARP request is the IP address of VM 3 1020. The forwarding element searches the address-mapping table to find the associated MAC address of VM 3 1020. As shown, the PFE identifies the associated MAC address without sending a packet to VM 3 1020 or utilizing any processes outside of the forwarding element 1030. The PFE changes a set of fields in the ARP request packet to convert it to an ARP reply packet. The resulting ARP reply packet is resubmitted to the PFE datapath, which causes the packet to be sent back to node 1005.

Figure 11:
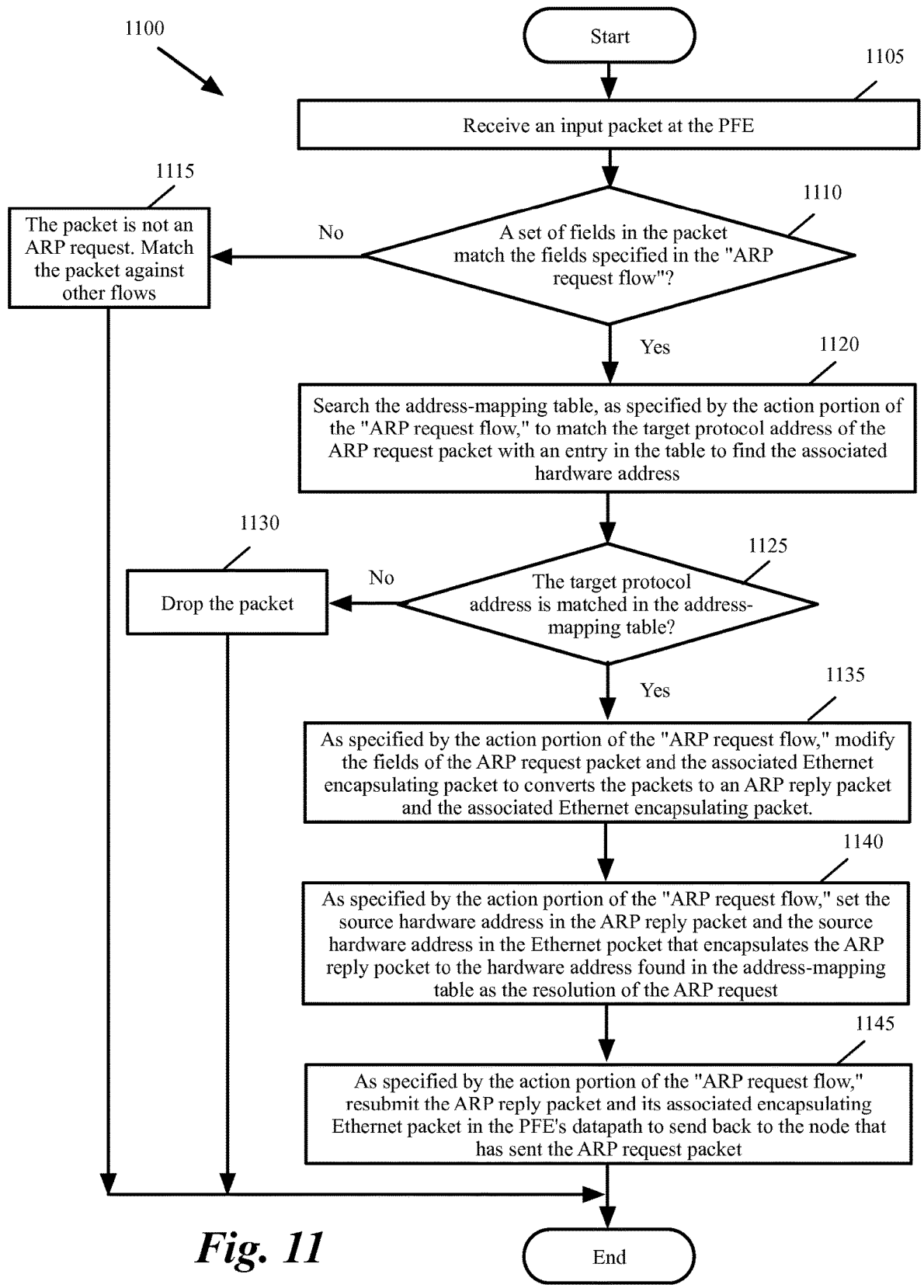
FIG. 11 conceptually illustrates a process for converting a broadcasted ARP request packet to an ARP reply packet in some embodiments of the invention.

FIG. 11 conceptually illustrates a process 1100 for converting a broadcasted ARP request packet to an ARP reply packet in some embodiments of the invention. The process is in some embodiments performed by a PFE that is configured to store a flow that matches a set of fields of an ARP request packet (referred herein as the ARP request flow). For instance, the matching criteria in the flow specifies that the EtherType field has to include a code for "ARP" and the ARP operation has to be "request."

As shown, the process receives (at 1105) a packet at a PFE. Different fields of the packet are compared against the fields specified in flows that are stored at the PFE. The process determines (at 1110) whether a set of fields in the packet match the fields specified in the ARP request flow. If not, the packet is not an ARP request packet. The packet is matched (at 1115) against other flows stored in the PFE. The process then ends.

Otherwise, when a set of fields in packet matches the fields specified in the ARP request flow, the packet is an ARP request. The process then performs the actions specified in the action portion of the ARP request flow. The process searches (at 1120), the address-mapping table to match the target protocol address of the ARP request with an entry in the table to find the associated hardware address.

The process then determines (at 1125) whether the target protocol address is matched in the address-mapping table. If not, the ARP request cannot be resolved and the process drops (at 1130) the packet (e.g., deletes the packet from the datapath of the PFE.

Otherwise, the process modifies the fields of the ARP request packet and the associated Ethernet encapsulating packet, as specified by the action portion of the ARP request flow, to converts the packets to an ARP reply packet and the associated Ethernet encapsulating packet. As a part converting the ARP request packet to an ARP reply packet, the process sets (at 1140) the source hardware address in the ARP reply packet and the source hardware address in the Ethernet pocket that encapsulates the ARP reply pocket to the hardware address found in the address-mapping table as the resolution of the ARP request. The process then resubmits the ARP reply packet in the PFE's datapath to send back the packet to the node that has sent the ARP request. The process then ends. Further details of converting the ARP request packet to an ARP reply packet by the PFE are described by reference to FIGS. 12 and 13, below.

Figure 12:
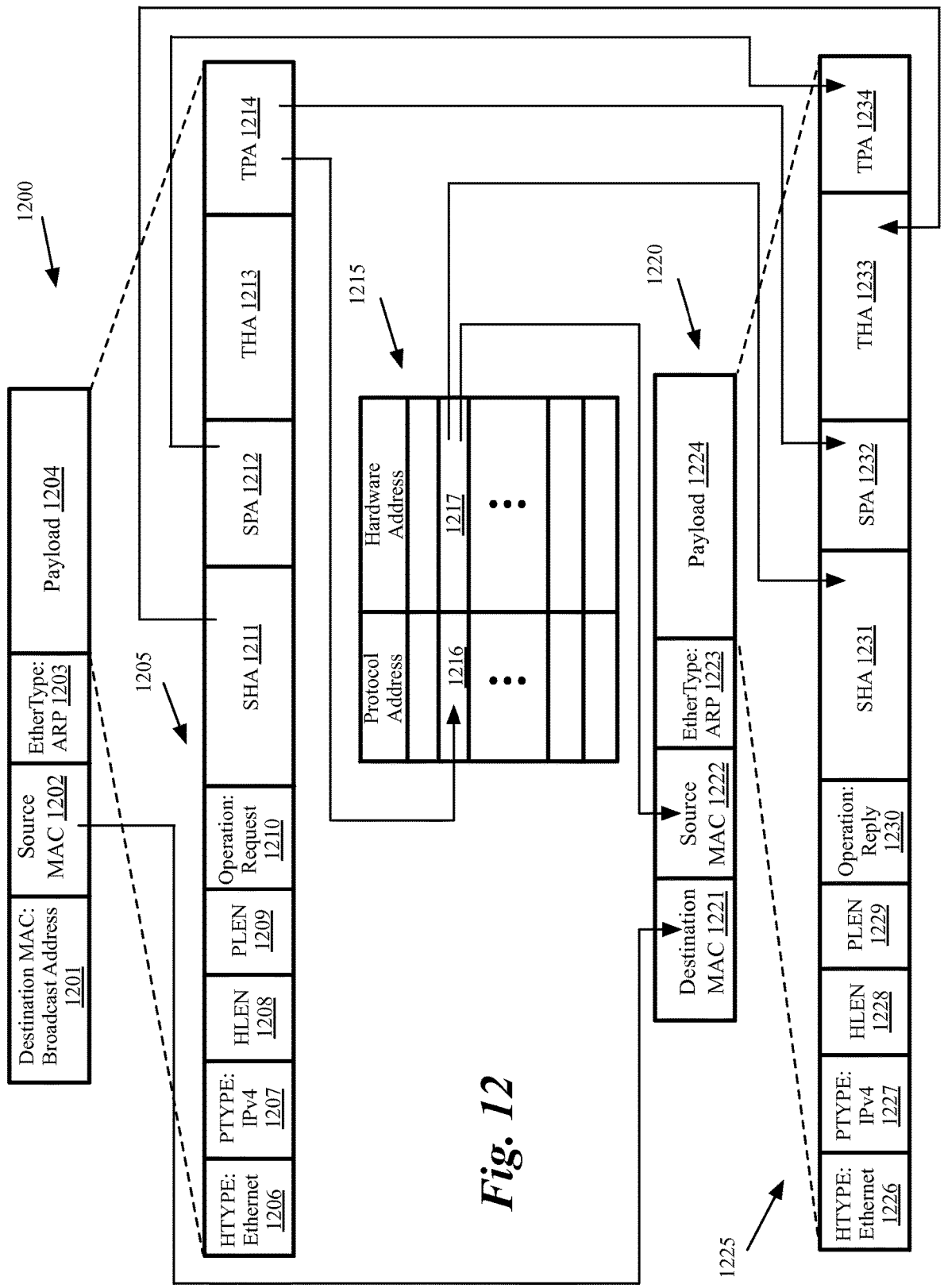
FIG. 12 conceptually illustrates receiving an ARP request packet at a forwarding element and sending an ARP reply packet in some embodiments of the invention.

FIG. 12 conceptually illustrates receiving an ARP request packet at a PFE and sending an ARP reply packet in some embodiments of the invention. In this example, the protocol address is an IP address and the hardware address is a MAC address. For simplicity, the only shows the address-mapping table, ARP request and reply packets, and the corresponding encapsulating Ethernet packets. All actions in this figure are performed at the PFE based on the actions specified in the flow that is used to match the ARP request at the PFE.

As shown, the Ethernet packet 1200 encapsulates an ARP request packet as the payload 1204. For simplicity, the preamble, SFD, and FCS fields of the Ethernet packet (as described above by reference to FIG. 6) are not shown.

The destination MAC address 1201 is set to an address (e.g., a hexadecimal value of FF:FF:FF:FF:FF:FF with all bits in the field set to 1), which is the address reserved for broadcasting packets. The source MAC address 1202 is the MAC address of the node that has initiated the ARP request. The EtherType 1203 identifies the payload 1204 as an ARP packet.

The ARP request packet is shown in the expanded view 1205. In this example, HTYPE field 1206 identifies the Layer 2 network protocol type as Ethernet. PTYPE field 1207 in this example identifies the protocol address (i.e., the Layer 3 protocol used) as IPv4. The HLEN 1208 and PLEN 1209 fields identify the length of MAC addresses and IP addresses, respectively. The operation field 1210 identifies the packet 1205 as an ARP request.

SHA 1211 is the MAC address of the node that initiated the ARP request. SPA 1212 is the IP address of the node that initiated the ARP request. THA field 1213 in the ARP request packet is ignored. TPA field 1214 is the IP address of the intended receiver. TPA field 1214 identifies the IP address of the node for which the MAC address is requested by the sender of the ARP request.

As shown, the PFE utilizes the copy 1215 of the address-mapping table maintained by the virtualization software associated with the forwarding element. The TPA 1214 of the ARP request packet is used as an index to search the address-mapping table 1215. In this example, a match is found in table for IP address 1216. The MAC address 1217 associated with this IP address is the MAC address that was requested in the ARP request packet. This is essentially the ARP resolution.

The forwarding element then prepares the ARP reply packet from the ARP request packet. In some embodiments, the forwarding element stores the received ARP request and the encapsulating Ethernet packet in temporary storage and modifies different fields of the packets to modify the ARP request packet to an ARP reply packet. In other embodiments, the forwarding element uses the information in the ARP request and the encapsulating Ethernet packet to generate an ARP reply packet and its encapsulating Ethernet packet.

As shown, the source MAC address 1202 is moved to the destination MAC address 1221 field of the Ethernet packet 1220 that encapsulates the ARP reply packet. This causes the packet to be delivered to the virtual interface that generated the ARP request packet. The source MAC address field 1222 is set to the MAC address 1217 found in the address-mapping table 1215. The Ethertype 1223 identifies the payload 1224 as an ARP packet.

The ARP reply packet is shown in the expanded view 1225. HTYPE 1226, PTYPE 1227, HLEN 1228, and PLEN 1229 are the same as the corresponding fields in the ARP request packet 1205. The operation field 1230 identifies the packet 1225 as an ARP reply packet.

SHA field 1231 is set to the hardware address 1217 found in the address-mapping table. SPA field 1232 is set to the TPA field 1214 of the ARP request (which is the same IP address 1216 that is found in the address-mapping table. SHA field 1211 of the ARP request is moved into THA field 1233 of the ARP reply. SPA field 1212 of the ARP request is moved into TPA 1234 of the ARP reply packet. The values of the THA and TPA fields in the ARP reply packet causes the ARP reply packet to be delivered to the node that initiated the ARP request.

Figure 13:
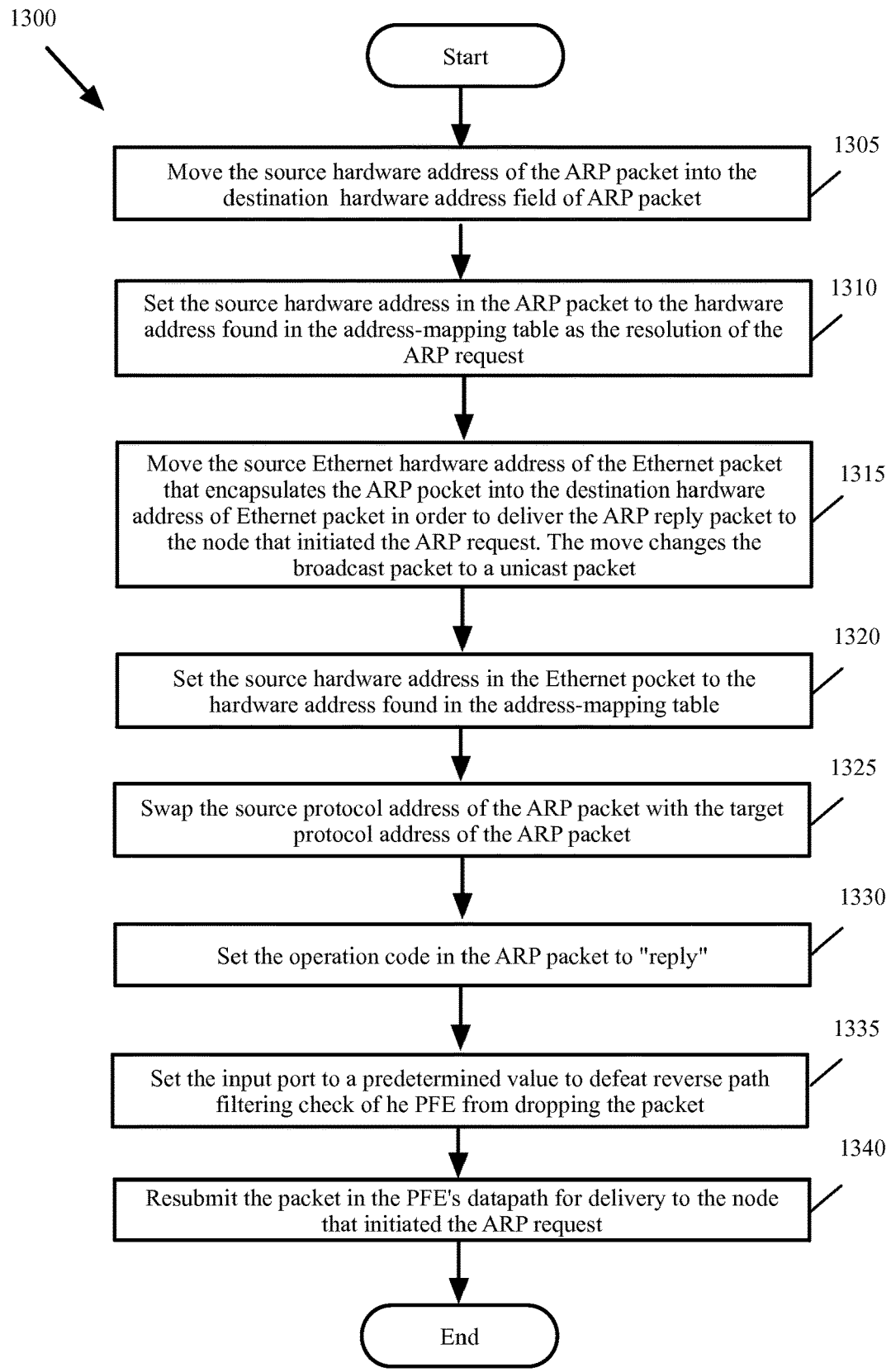
FIG. 13 conceptually illustrates an ARP suppression process in some embodiments of the invention.

FIG. 13 conceptually illustrates a process 1300 for performing the actions specified in a flow after an ARP request packet is matched with the fields specified in the flow. The process provides further details for operations 1135-1145 of process 1100 in FIG. 11. Process 1300 is performed based on the actions specified in the flow that is used to match the ARP request. All operations are performed on the same ARP packet and the associated encapsulating Ethernet packet to convert the packet from an ARP request packet to an ARP reply packet. Also implied in all operations of process 1300 is that the operations that move a value from a first field of the packet to a second field of the packet save the previous value of the second field before the value is replaced if the value of the second field is needed in a later operation.

As shown in FIG. 13, the process moves (at 1305) the source hardware address of the ARP packet into the destination hardware address field of ARP packet. The process sets (at 1310) the source hardware address in the ARP packet to the hardware address found in the address-mapping table as the resolution of the ARP request. The process moves (at 1315) the source Ethernet hardware address of the Ethernet packet that encapsulates the ARP pocket into the destination hardware address of Ethernet packet in order to deliver the ARP reply packet to the node that initiated the ARP request. The move changes the broadcast packet to a unicast packet (the destination hardware address is no longer set to FF:FF:FF:FF:FF:FF).

The process sets (at 1320) the source hardware address in the Ethernet pocket to the hardware address found in the address-mapping table. The process swaps (at 1325) the source protocol address of the ARP packet with the target protocol address of the ARP packet. The process sets (at 1330) the operation code in the ARP reply packet to "reply."

The process also sets (at 1335) the input port specified for the packet to a predetermined value (e.g., zero) to defeat reverse path filtering check of the PFE from dropping the packet. Reverse path filtering is a mechanism used by PFEs to make sure the source address of a received packet is reachable through the interface the packet came in (e.g., to prevent an attacker from outside a network to send a packet that causes the corresponding reply packet to be sent back to a destination inside the network). The process then resubmits (at 1340) the packet in the PFE's datapath for delivery to the node that initiated the ARP request. The process then ends.

V. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 14:
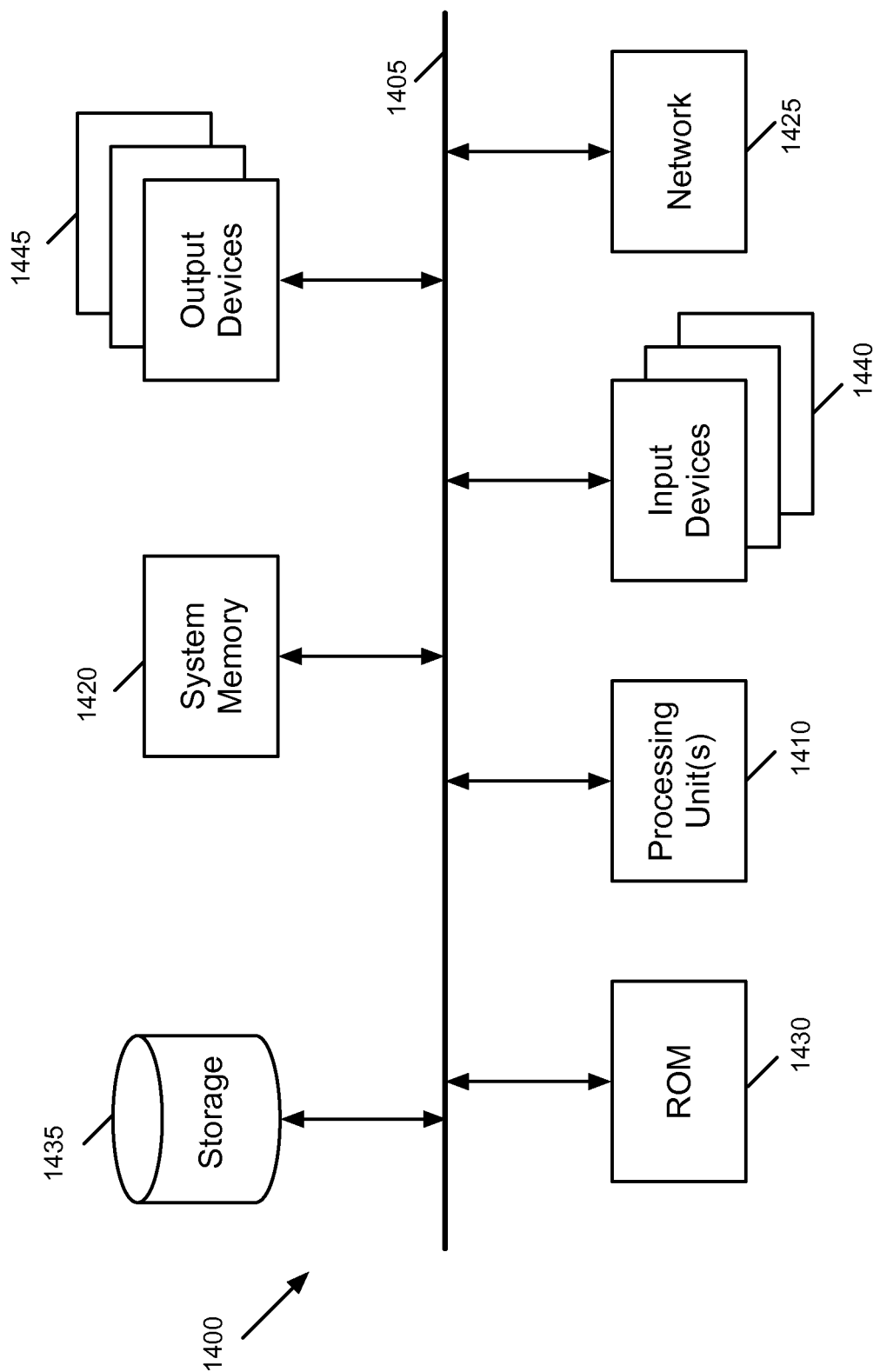
FIG. 14 conceptually illustrates an electronic system with which some embodiments of the invention are implemented.

FIG. 14 conceptually illustrates an electronic system 1400 with which some embodiments of the invention are implemented. The electronic system 1400 can be used to execute any of the control, virtualization, or operating system applications described above. The electronic system 1400 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1400 includes a bus 1405, processing unit(s) 1410, a system memory 1422, a read-only memory 1430, a permanent storage device 1435, input devices 1440, and output devices 1445.

The bus 1405 collectively represents all system, peripheral, and chipset buses that communicatively connect the numerous internal devices of the electronic system 1400. For instance, the bus 1405 communicatively connects the processing unit(s) 1410 with the read-only memory 1430, the system memory 1420, and the permanent storage device 1435.

From these various memory units, the processing unit(s) 1410 retrieve instructions to execute and data to process in order to execute the processes of the invention. The processing unit(s) may be a single processor or a multi-core processor in different embodiments.

The read-only-memory (ROM) 1430 stores static data and instructions that are needed by the processing unit(s) 1410 and other modules of the electronic system. The permanent storage device 1435, on the other hand, is a read-and-write memory device. This device is a non-volatile memory unit that stores instructions and data even when the electronic system 1400 is off. Some embodiments of the invention use a mass-storage device (such as a magnetic or optical disk and its corresponding disk drive) as the permanent storage device 1435.

Other embodiments use a removable storage device (such as a floppy disk, flash drive, etc.) as the permanent storage device. Like the permanent storage device 1435, the system memory 1420 is a read-and-write memory device. However, unlike storage device 1435, the system memory is a volatile read-and-write memory, such a random access memory. The system memory stores some of the instructions and data that the processor needs at runtime. In some embodiments, the invention's processes are stored in the system memory 1420, the permanent storage device 1435, and/or the read-only memory 1430. From these various memory units, the processing unit(s) 1410 retrieve instructions to execute and data to process in order to execute the processes of some embodiments.

The bus 1405 also connects to the input and output devices 1440 and 1445. The input devices enable the user to communicate information and select commands to the electronic system. The input devices 1440 include alphanumeric keyboards and pointing devices (also called "cursor control devices"). The output devices 1445 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 14, bus 1405 also couples electronic system 1400 to a network 1425 through a network adapter (not shown). In this manner, the computer can be a part of a network of computers (such as a local area network ("LAN"), a wide area network ("WAN"), or an Intranet, or a network of networks, such as the Internet. Any or all components of electronic system 1400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 9, 11, and 13) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

In several figures described above, several embodiments are described for suppressing broadcast messages in computing and networking environments that include virtual machines and logical networks. However, one of ordinary skill will realize that the some embodiments are used in traditional physical networks with large numbers of computers or with numerous VMs executing on numerous hosts, in order to reduce broadcast message in these more traditional environments.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In view of the foregoing, one of ordinary skill in the art would understand that the invention is not to be limited by the foregoing illustrative details, but rather is to be defined by the appended claims.

What is claimed is:

1. For a forwarding element operating on a physical host, a method for suppressing address resolution request (ARP) packets in a logical network comprising a set of data compute nodes (DCNs) that each have an assigned network address, the method comprising:
   at the forwarding element,
      receiving an ARP request packet sent by a first DCN of the logical network that operates on the same physical host as the forwarding element, the ARP request packet identifying a network address of a second DCN of the logical network, and wherein the ARP request packet comprises an ARP request operation code;
      searching an address-mapping table of the forwarding element to determine a corresponding hardware address for the identified network address without broadcasting the ARP request packet to any DCNs of the logical network, wherein the address-mapping table maps the network address of each of a plurality of DCNs in the logical network to a corresponding hardware address;
      modifying a set of fields in the ARP request packet to convert the ARP request packet directly into an ARP reply packet by replacing the ARP request operation code with an ARP reply operation code, the ARP reply packet comprising the ARP reply operation code and the determined hardware address as a resolution of the ARP request; and
      sending the converted ARP reply packet to the first DCN.

2. The method of claim 1, wherein the network address of the second DCN is an Internet protocol (IP) address of the second DCN, wherein the determined hardware address is a media access control (MAC) address of the second DCN.

3. The method of claim 1, wherein the ARP reply packet is in a same format as the ARP request packet, and a source field of the ARP reply packet has the network address of the second DCN identified in the ARP request packet.

4. The method of claim 1, wherein the ARP request packet further comprises a source address corresponding to the first DCN, wherein modifying the set of fields in the ARP request packet to convert the ARP request packet to the ARP reply packet further comprises modifying a destination address of the ARP request packet to said source address of the first DCN.

5. The method of claim 1, wherein the ARP request packet further comprises an ARP source hardware address (SHA) field, wherein modifying the set of fields in the ARP request packet to convert the ARP request packet to the ARP reply packet further comprises setting an ARP target hardware address field in the ARP reply packet to a value of the ARP SHA field of the ARP request packet.

6. The method of claim 1, wherein the ARP request packet further comprises an ARP source protocol address (SPA) field, wherein modifying the set of fields in the ARP request packet to convert the ARP request packet to the ARP reply packet further comprises setting an ARP target protocol address (TPA) field in the ARP reply packet to a value of the ARP SPA field of the ARP request packet.

7. The method of claim 1, wherein modifying the set of fields in the ARP request packet to convert the ARP request packet to the ARP reply packet further comprises setting an ARP source hardware address (SHA) field in the ARP reply packet to the hardware address determined from the address-mapping table of the forwarding element.

8. The method of claim 1, wherein modifying the set of fields in the ARP request packet to convert the ARP request packet to the ARP reply packet further comprises setting an ARP source protocol address (SPA) field in the ARP reply packet to the network address identifying the second DCN in the ARP request packet.

9. The method of claim 1, wherein modifying the set of fields in the ARP request packet to convert the ARP request packet to the ARP reply packet further comprises setting an input port for the ARP reply packet to a particular value, wherein the particular value is any value that prevents the forwarding element from dropping the ARP reply packet.

10. The method of claim 1, wherein:
   receiving the ARP request packet comprises defining a packet object for the ARP request packet;
   modifying the set of fields in the ARP request packet to convert the ARP request packet directly into an ARP reply packet further comprises modifying fields of the defined packet object; and
   sending the converted ARP reply packet to the first DCN comprises resubmitting the defined packet object to the forwarding element with the modified set of fields.

11. The method of claim 1, wherein the set of fields is a first set of fields, wherein a second set of fields of the ARP request packet stay the same when the ARP request packet is converted into the ARP reply packet.

12. The method of claim 1, wherein:
   receiving the ARP request packet comprises performing a first set of match-action operations on a received packet to determine that the received packet is an ARP request packet;
   searching the address-mapping table of the forwarding element comprises performing a second set of match-action operations to search the address-mapping table of the forwarding element; and modifying a set of fields in the ARP request packet to convert the ARP request packet directly into an ARP reply packet further comprises performing a set of match-action operations on the ARP request packet that modifies the set of fields.

13. A non-transitory machine readable medium storing a forwarding element that when executed by at least one processing unit of a physical host suppresses address resolution request (ARP) packets in a logical network comprising a set of data compute nodes (DCNs) that each have an assigned network address, the forwarding element comprising sets of instructions for:

receiving an ARP request packet sent by a first DCN of the logical network that operates on the same physical host as the forwarding element, the ARP request packet identifying a network address of a second DCN of the logical network, and wherein the ARP request packet comprises an ARP request operation code;

searching an address-mapping table of the forwarding element to determine a corresponding hardware address for the identified network address without broadcasting the ARP request packet to any DCNs of the logical network, wherein the address-mapping table maps the network address of each of a plurality of DCNs in the logical network to a corresponding hardware address;

modifying a set of fields in the ARP request packet to convert the ARP request packet directly into an ARP reply packet by replacing the ARP request operation code with an ARP reply operation code, the ARP reply packet comprising the ARP reply operation code and the determined hardware address as a resolution of the ARP request; and sending the converted ARP reply packet to the first DCN.

14. The non-transitory machine readable medium of claim 13, wherein the network address of the second DCN is an Internet protocol (IP) address of the second DCN, wherein the determined hardware address is a media access control (MAC) address of the second DCN.

15. The non-transitory machine readable medium of claim 13, wherein the ARP reply packet is in a same format as the ARP request packet, and a source field of the ARP reply packet has the network address of the second DCN identified in the ARP request packet.

16. The non-transitory machine readable medium of claim 13, wherein the ARP request packet further comprises a source address corresponding to the first DCN, wherein the set of instructions for modifying the set of fields in the ARP request packet to convert the ARP request packet to the ARP reply packet further comprises a set of instructions for modifying a destination address of the ARP request packet to said source address of the first DCN.

17. The non-transitory machine readable medium of claim 13, wherein the ARP request packet further comprises an ARP source hardware address (SHA) field, wherein the set of instructions for modifying the set of fields in the ARP request packet to convert the ARP request packet to the ARP reply packet further comprises a set of instructions for setting an ARP target hardware address field in the ARP reply packet to a value of the ARP SHA field of the ARP request packet.

18. The non-transitory machine readable medium of claim 13, wherein the ARP request packet further comprises an ARP source protocol address (SPA) field, wherein the set of instructions for modifying the set of fields in the ARP request packet to convert the ARP request packet to the ARP reply packet further comprises a set of instructions for setting an ARP target protocol address (TPA) field in the ARP reply packet to a value of the ARP SPA field of the ARP request packet.

19. The non-transitory machine readable medium of claim 13, wherein the set of instructions for modifying the set of fields in the ARP request packet to convert the ARP request packet to the ARP reply packet further comprises a set of instructions for setting an ARP source hardware address (SHA) field in the ARP reply packet to the hardware address determined from the address-mapping table of the forwarding element.

20. The non-transitory machine readable medium of claim 13, wherein the set of instructions for modifying the set of fields in the ARP request packet to convert the ARP request packet to the ARP reply packet further comprises a set of instructions for setting an ARP source protocol address (SPA) field in the ARP reply packet to the network address identifying the second DCN in the ARP request packet.

21. The non-transitory machine readable medium of claim 13, wherein the set of instructions for modifying the set of fields in the ARP request packet to convert the ARP request packet to the ARP reply packet further comprises a set of instructions for setting an input port for the ARP reply packet to a particular value, wherein the particular value is any value that prevents the forwarding element from dropping the ARP reply packet.

22. The non-transitory machine readable medium of claim 13, wherein:

the set of instructions for receiving the ARP request packet comprises a set of instructions for performing a first set of match-action operations on a received packet to determine that the received packet is an ARP request packet;

the set of instructions for searching the address-mapping table of the forwarding element comprises a set of instructions for performing a second set of match-action operations to search the address-mapping table of the forwarding element; and the set of instructions for modifying a set of fields in the ARP request packet to convert the ARP request packet directly into an ARP reply packet further comprises a set of instructions for performing a set of match-action operations on the ARP request packet that modifies the set of fields.

* * * * *